United States Patent [19]
Walsh

[11] Patent Number: 5,980,971
[45] Date of Patent: Nov. 9, 1999

[54] METHOD FOR MANUFACTURE OF DRY INSTANTLY REHYDRATABLE BEAN PASTE

[75] Inventor: David E. Walsh, Greenville, S.C.

[73] Assignee: Heart of the Valley Cooperative, Portland, N. Dak.

[21] Appl. No.: 08/503,535

[22] Filed: Jul. 18, 1995

[51] Int. Cl.$^6$ ................................................ A23L 1/20
[52] U.S. Cl. .................. 426/634; 426/459; 426/460; 426/507; 426/509; 426/518; 426/629
[58] Field of Search ..................... 426/629, 634, 426/640, 454, 460, 508, 509, 518, 96, 507

[56] References Cited

U.S. PATENT DOCUMENTS

| | | |
|---|---|---|
| 1,088,741 | 3/1914 | Stephens . |
| 1,813,268 | 7/1931 | Bachler . |
| 2,343,149 | 2/1944 | Krause, Jr. . |
| 2,475,554 | 7/1949 | Möller ................................. 99/104 |
| 2,584,150 | 2/1952 | Morris ................................. 99/98 |
| 2,657,999 | 11/1953 | Rauch ................................. 99/264 |
| 3,290,159 | 12/1966 | Dorsey et al. ....................... 99/204 |
| 3,385,709 | 5/1968 | Wenger et al. ...................... 99/2 |
| 3,489,571 | 1/1970 | Hannum .............................. 99/98 |
| 3,642,494 | 2/1972 | Wagner ............................... 426/634 |
| 3,800,056 | 3/1974 | Mitchell, Jr. ....................... 426/457 |
| 4,084,016 | 4/1978 | Kon et al. .......................... 426/634 |
| 4,181,072 | 1/1980 | Hirahara ............................. 99/353 |
| 4,194,018 | 3/1980 | Hodel et al. ........................ 426/580 |
| 4,214,013 | 7/1980 | Hirahara ............................. 426/629 |
| 4,233,322 | 11/1980 | Fritze ................................. 426/634 |
| 4,251,558 | 2/1981 | Kobayashi et al. ................. 426/473 |
| 4,350,480 | 9/1982 | Bammert ............................. 418/201 |
| 4,400,402 | 8/1983 | Vibbert et al. ..................... 426/471 |
| 4,407,840 | 10/1983 | Lathrop et al. .................... 426/629 |
| 4,645,677 | 2/1987 | Lawhon et al. .................... 426/431 |
| 4,676,990 | 6/1987 | Huffman et al. ................... 426/634 |
| 4,735,816 | 4/1988 | Sterner et al. ..................... 426/457 |
| 4,853,248 | 8/1989 | Würsch et al. ..................... 426/634 |
| 4,871,567 | 10/1989 | Sterner et al. ..................... 426/461 |
| 4,877,637 | 10/1989 | Harp .................................. 426/634 |
| 4,900,578 | 2/1990 | Bakker et al. ..................... 426/634 |
| 4,923,710 | 5/1990 | van der Marel ................... 426/634 |
| 4,943,441 | 7/1990 | McCabe ............................. 426/511 |
| 5,151,285 | 9/1992 | Williams et al. .................. 426/241 |
| 5,213,831 | 5/1993 | Leggott et al. .................... 426/634 |

FOREIGN PATENT DOCUMENTS

| | | |
|---|---|---|
| 0210448 | 2/1987 | European Pat. Off. . |
| 0336571 | 10/1989 | European Pat. Off. . |

*Primary Examiner*—Lien Tran
*Attorney, Agent, or Firm*—Schwegman, Lundberg, Woessner & Kluth, P.A.

[57] ABSTRACT

Processes are disclosed for the preparation and manufacture of dried legumes to make a quick cooking whole bean and bean paste food product which is rehydrated to a food product having the appearance and organoleptic texture of canned or conventionally prepared Mexican style refried bean product. One embodiment is the production of dehydrated bean flakes and/or powders which are instantly rehydratable. Subsequent to cleaning, sorting and washing, the beans are either milled by dry grinding or wet milling. The slurry is cooked and dried by a continuous method. Another embodiment is the production of dehydrated whole beans. Whole beans are cooked by conventional methods without pre-cooking or soaking after being sorted, cleaned, and washed. After cooking the whole beans, beans which are no longer intact and now are in the form of a slurry are separated from the intact beans. The whole beans are dried in a manner which does not disrupt their intact structure. The cooked bean slurry is dehydrated to form a flake and/or a powder.

30 Claims, 1 Drawing Sheet

METHOD FOR MANUFACTURE OF DRY INSTANTLY REHYDRATABLE BEAN PASTE

BACKGROUND OF THE INVENTION

The present invention concerns improvements in the processing, production and product quality of a dry flaked or intact, reconstitutable leguminous product. More particularly, the invention relates to a continuous process for producing a dry flaked, instantly reconstitutable Mexican refried bean product. The invention is an advance in the technology for the preparation of a rehydratable bean product because the method eliminates the steps of soaking and pre-cooking the beans, reduces the cooking time, and consistently results in a dried product that is truly reconstitutable to a product with the desired characteristics of Mexican style refried beans.

Refried beans are a popular side-dish used in Mexican style cooking. Mexican style foods have become one of the fastest growing segments in the American food market, both for home use and in institutions such as restaurants. Usually the product is prepared from scratch in a process that involves several steps in the kitchen. These steps include soaking the beans for several hours, cooking the beans in a kettle for several more hours, and mashing the cooked beans. The cook usually prepares a large batch which is then refrigerated and refried by heating a portion of the batch to serve at each meal. Since this process is time consuming, expensive and labor intensive, canned refried beans have become popular for home use. However, canned beans are expensive and inefficient to use in the preparation of refried beans for institutional and restaurant use where large quantities of a product with consistent characteristics is desired.

Restaurant-sized cans of beans are heavy, expensive to ship, require large storage areas, and are inconvenient to use in the preparation of large quantities of refried beans. Restaurant cooks must open many cans to prepare large servings. Cooks must be skilled in the cooking of refried beans so that a consistent, high quality product is offered to customers. Disposal of the resulting empty cans is also a problem for the restaurant. Therefore, dehydrated beans packed in bags are preferred for restaurant and institutional feeding. Not only is shipping and storage easier and less expensive, but also the preparation is simpler, usually just involving adding hot water and serving. In addition, the cost per serving for dehydrated refried beans is less than that of canned refried beans. These factors have led to a growing demand for dehydrated refried bean products for institutional and restaurant food preparation.

The prior art in the commercial preparation of dehydrated bean products has provided numerous methods to form dried whole beans, bean flakes, and bean powders which are reconstitutable. In general, these prior art methods consist of combinations of the following steps; soaking, blanching, parboiling, physical manipulations prior to cooking, cooking under pressure or at atmospheric pressure, post-cooking manipulations, and various methods of drying the cooked product. If the desired final product is dehydrated, cooked whole beans, the prior art discloses that beans are soaked or blanched without pre-cooking physical manipulation. The prior art discloses reconstitution of dried flaked and/or powder product as occurring with hot water in a few minutes. Reconstitution of dehydrated, cooked whole beans occurs in approximately fifteen minutes. Both batch and continuous processes are disclosed in the prior art for making dried leguminous products.

Problems encountered by the prior art methods include large production areas to soak and cook the beans, long time periods necessary for soaking and cooking the beans, lack of adequate controls over the cooking process leading to over or under cooking and batch to batch variability, and a product that does not closely resemble the conventionally prepared product In addition, the reconstitution of the dried product often takes longer than a few minutes, even when hot water is used. Moreover, powders produced by these methods tend to produce a lumpy product after rehydration.

As such, there is a continuing need in the art to provide a dried, leguminous product in large quantities, in a rapid fashion, with reduced production costs in a form that is easy to ship, store, and prepare. There is also a continuing need to make a product that has consistent properties, when rehydrated can have a variety of textures, which instantly rehydrates with either hot or cold water, and when rehydrated has the texture, taste, color, and appearance of legumes prepared in a conventional manner.

SUMMARY OF THE INVENTION

A method for producing dehydrated leguminous food products which with the addition of liquid instantly forms a reconstituted food product having the characteristic flavor, appearance and color of non-dehydrated, cooked leguminous food products is described. These dehydrated products are produced by milling the legumes to form a slurry or paste containing particles and liquid, cooking the resulting leguminous slurry or paste, and drying the cooked food product. The dried food product is instantly rehydratable with a liquid.

Another embodiment of the invention is a method for producing both intact and less than intact, i.e. sub-intact, dehydrated leguminous food products by employing parallel processing systems. One processing system mills legumes to form a slurry or paste containing particles and liquid, cooks the resulting leguminous slurry or paste, then dries the slurry or paste. In the parallel processing system, intact legumes are cooked without soaking or other pre-cooking steps, the sub-intact cooked product is removed from the intact cooked product and the sub-intact cooked product is combined with the cooked, milled product prior to drying. The intact, cooked legumes are dried in such a manner as to not disrupt their intact structure. These intact and sub-intact dried products can be mixed in various ratios before or after being rehydrated with a liquid to form a product having the characteristic flavor, texture, appearance and color of non-dehydrated, cooked leguminous food products.

Another embodiment of the invention is a method for producing dehydrated intact leguminous food products which with the addition of liquid forms a reconstituted food product having the characteristic flavor, appearance and color of non-dehydrated, cooked, intact leguminous food product. These dehydrated products are produced by cooking the uncooked, intact leguminous food product without soaking or other precooking steps, and drying the cooked, intact food product. The dried food product is quickly rehydratable with a liquid.

DESCRIPTION OF THE FIGURE

The FIGURE is a process flow diagram for the apparatus employed in and the method of the present invention.

DETAILED DESCRIPTION OF THE INVENTION

Figure 1:
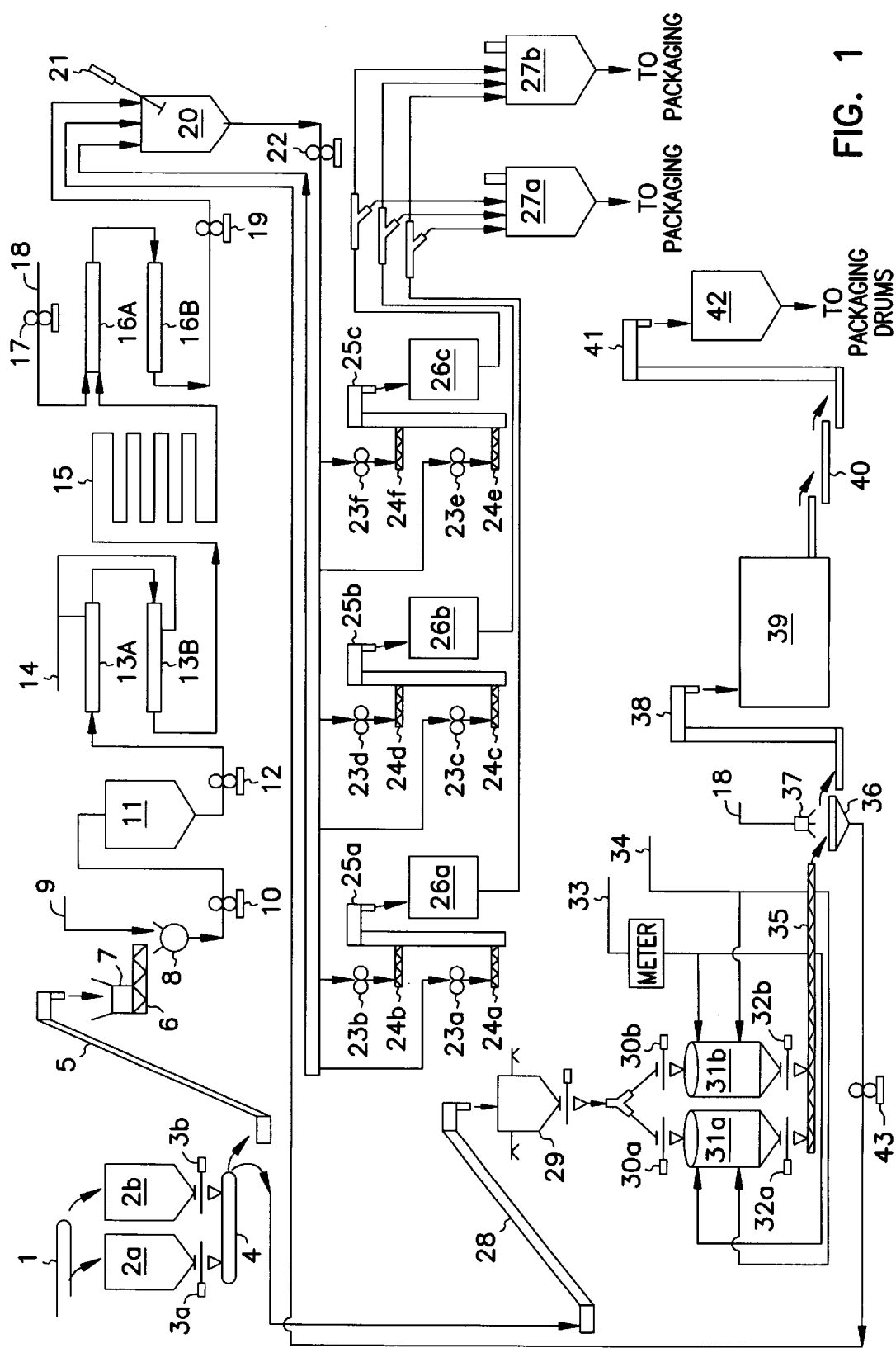

The present invention is an advancement in methods for producing dry, rapidly reconstitutable food products. The problems encountered by the prior art processes and products, as well as other problems, have been overcome by the present invention. The invention is a process which begins with washed legumes which are subsequently milled to form particles. These particles are mixed with liquid either during the milling or subsequent to milling. The resulting slurry is pumped under pressure into an apparatus which heats the slurry. After the slurry is cooked, the slurry is dried. The dried product can be collected and further processed. In a parallel process, legumes are cooked in a batch format so that the cooked legumes retain their original, intact form. After cooking, these intact legumes are separated from any leguminous material that is not intact. The intact legumes and non-intact leguminous materials are then dried.

By milling the beans prior to cooking, one embodiment of the present invention eliminates soaking the beans, greatly speeds up cooking times, and results in a superior product. By eliminating the need for large soaking vessels and long soaking times, the present invention dramatically decreases the production times for dehydrated whole beans and bean paste, and decreases the need for large areas devoted to soaking beans. By eliminating the need for batch cooking vessels and long cooking times for the flaked and/or powder product, one embodiment of the invention eliminates the need for large amounts of floor space to accommodate industrial size kettles and shortens the time for cooking. The use of either direct steam injection or indirect heat exchangers in a continuous cooking process is more efficient than batch cooking because very little heat escapes to the room during the shortened time required for cooking in a closed, continuous cooking system. In addition, the cooked product dries faster than its non-milled counterpart, thus saving on energy as well. By collecting the cooked bean product which is no longer intact after batch cooking whole beans and drying this sub-intact product to a flake and/or powder, the production of dehydrated whole beans is made more economical.

The flakes and powders produced by the milling of beans prior to cooking are superior to similar products produced by other methods. There is little variation in the quality of the product produced by this method. The powders produced by this method do not produce a lumpy product after rehydration. Dehydrated products produced by the present method are rapidly reconstituted even in cold water. Cold water reconstitution is useful for bean dips, dry mixes, and items destined to be frozen. This method can be practiced with clean-in-place equipment. Furthermore, this process is not limited to bean products but can be used to produce any legumes, grain or starch based instant cooking food paste.

Although the preferred embodiment of the present invention is directed to making a dried bean product, this process is not limited to beans, but can be used to produce any legume, grain or starch dried food product.

PRE-MILLING

Dried legumes are subjected to inspection, sorting, prewashing and washing in an automatic or manual manner in accordance with known methods in the art. Legumes which are inferior or substandard are discarded at this time. After washing, the legumes are drained and any residual water removed. At this time, beans are divided into separate lots, one lot destined to be milled, the other to remain whole.

MILLING

Legumes destined to become paste are milled either by grinding the beans dry or milling them in the presence of a liquid. The preferred liquid is water. Whole beans or bean pieces can be used for milling.

If legumes are wet milled, water is injected into the mill during the milling process. Injected water can be at any temperature. The injection of hot water is a preferred embodiment of the invention. The injection of water heated to temperatures of 160–180° F. is a more preferred embodiment of the invention. The resulting slurry can contain a variety of particle sizes ranging from coarse to fine. It is preferred that the solids content of the slurry is between 20–50%. The slurry can be passed directly into a surge tank or, in the alternative, be passed through a variety of mesh sizes prior to entering the surge tank. The size of the mesh chosen is based on the desired characteristics of the final product. Preferred mesh sizes range from 10 to 100. The slurry is held in the surge tank for times of 10–50 minutes. The time the slurry is held in the surge tank is the shortest period of time consistent with the need to balance the flow of product throughout the entire process. The slurry can also be passed through mesh of varying pore sizes as the slurry passes from the surge tank into the continuous cooker. Wet milling is a preferred embodiment of the invention.

An alternative embodiment of the invention is dry milling the beans. Whole beans or bean pieces which are dry milled can be ground to a variety of particle sizes as well, ranging from coarse to fine. Before dry milled beans are mixed with an aqueous liquid, they can be passed through mesh of various sizes. After, or during the transfer of the dry, milled beans to the surge tank, the milled product is mixed with an aqueous liquid, preferably water, to form a slurry. It is preferred that the slurry have a solids content of 20–50%. The temperature of the aqueous liquid used to form the slurry can be either hot or cold. Mixing the dry milled beans with hot water in the surge tank is a preferred embodiment of the invention. The slurry is held in the surge tank for times of 10–50 minutes. The time the slurry is held in the surge tank is the shortest period of time consistent with the need to balance the flow of product throughout the entire process. The slurry can optionally be passed through a variety of mesh sizes after it leaves the surge tank.

Other ingredients can be added to the beans at any time during the process. One embodiment of the invention is to add ingredients to the slurry while it is in the surge tank. Such ingredients might include fats, such as lard, flavoring, salt, preservatives, spices and acid. The slurry is then pumped under pressure to the cooker.

COOKING

The cooking temperature, the length and diameter of the tube used to cook the product destined to be bean paste, as well as the rate of pumping of the slurry will determine the time necessary to cook the product, without over or under cooking the product. The color of the final product is also determined by the cooking time. Either direct or indirect heating methods can be used. A preferred embodiment of the invention is an indirect cooking method. Preferred embodiments of the indirect cooking method include plate heat exchanger, shell-in-tube, or swept surface heat exchanger. The swept surface heat exchanger is the most preferred embodiment of the indirect heating method because it adds mechanical action to the cooking slurry which results in a cooked product with a smooth texture and excellent mouth feel. The most preferred embodiment of a swept surface heat exchanger is one manufactured by Votator.

An alternative method of heating is a direct cooking method. A preferred embodiment of the direct cooking method is the injection of food grade steam directly into the slurry. This method instantly heats the slurry under pressure and speeds cooking.

The slurry is pumped under pressure through the cooker heated to a temperature which will result in a cooked product. Preferred cooking temperatures range from between 250–400° F. Preferred pressures range from between atmospheric pressure and 350 psi. Cooking times range between 5 seconds and 15 minutes. Preferred cooking times are from 2–3 minutes at pressures of 50–75 psi.

The cooked product is then pumped under pressure to a water jacketed tube which cools the product below its boiling point. Cold water can be added to the cooked product to assist in the cooling process, dilute the slurry, and increase the flow rate.

Beans which are destined to remain whole are cooked by a batch method, without a prior soaking, tempering, blanching or parboiling step. A preferred embodiment of the invention is to cook the beans which are to remain whole under pressure using direct injection of steam. This is a method well known in the art. Cooking times will vary. Preferred cooking times are between 20 minutes and one hour. During the cooking process a portion of the beans will rupture. After cooking is completed, cool water is added to the cooking vessel to cool the product to below its boiling temperature. After cooling, the cooked whole beans are separated from the ruptured beans. A preferred embodiment of this separation is to drain the cooked product over a coarse mesh which allows beans which ruptured during cooking or were otherwise reduced to less than intact beans, to pass through the mesh. Whole beans which are retained by the mesh are then rinsed and drained before they are dried. The portion of the cooked product which passed through the mesh is of a consistency similar to that of bean paste produced after milling and cooking. A preferred consistency is 10–35% bean solids. A most preferred consistency is 15–30% bean solids.

Another embodiment of the invention is cooking whole, intact beans without presoaking or other precooking steps without employing a parallel processing system for the non-intact, cooked food product. Beans which are destined to remain whole are cooked by a batch method, without a prior soaking, tempering, blanching or parboiling step. A preferred embodiment of the invention is to cook the beans which are to remain whole under pressure using direct injection of steam. Cooking times will vary. Preferred cooking times are between 20 minutes and one hour. During the cooking process a portion of the beans will rupture. After cooking is completed, cool water is added to the cooking vessel to cool the product to below its boiling temperature. After cooling, the cooked whole beans are separated from the ruptured beans. Whole beans which are retained by the mesh are then rinsed and drained before they are dried.

DRYING

After cooling, the product derived from milled beans, or from the ruptured beans after batch cooking, is dried to the form of a flake and/or powder. The product passes from the water jacketed cooling system to a cooked bean slurry tank. The slurry derived from the cooked whole beans is transferred into the cooked bean slurry tank without further cooling. A preferred embodiment of the invention is the merging of the milled bean derived slurry and the slurry derived from the whole beans which did not remain intact after cooking into the same slurry tank. From that tank, the cooked slurry is fed into a dryer. Any method of drying which results in a dried food product can be employed. Preferred methods of drying include, but are not limited to, belt dryers, spray driers, fluid bed dryers, drum dryers and tray dryers heated by steam, hot water, hot oil, heated air, electrical, infrared, microwave radiation or direct fire. A more preferred method of drying is a rotating drum dryer. Either a single or double drum dryer can be used. The most preferred method of drying is a double drum dryer. The inside of the drum is heated, preferably with steam, and most preferably under 10–150 pounds of pressure per square inch. Steam heated drum drying is the most preferred method of drying because it uses less energy. The thickness of the film, and the resulting flake, can be varied by changing the settings of the drum dryer gap between the rolls. A preferred form of the product is a film of 0.001–0.25 inches in thickness. The product is dried to a moisture content of 5–12%.

With any device used to dry the product, the surface where the cooked food product adheres must be above the boiling temperature of water. This causes the water in the slurry to boil away and form a dry product on the heated surface. The thickness of the dried film is determined by either the gap between the drum and/or feed rolls and the ratio of water to solids in the cooked slurry. The thinner the film which is placed on the heated surface, or which is pressed to a reduced thickness after being placed on the heated surface, the more rapid is the drying process. The dried film or sheet can be removed by scraping Dried sheets and/or flakes are collected.

Whole beans are dried by any means which allows the beans to dry without damaging their appearance. The product is dried to a moisture content of 5–12%. A preferred method of drying whole beans is a forced air belt dryer.

FLAKING

After collection, the dried film or sheet can be further processed by passing it through various flake sizing mills. Thus, various sized flakes and various particle sizes of powders can be produced. Preferred sizes of flakes range from flakes ½ inch in size to flakes which pass through size 10 mesh. Flakes may be ground to powder, depending upon the desired characteristics of the final product. During or after processing, dried flakes and/or powders of different sizes can be mixed with each other, as well as with dried whole beans. In addition, dried flakes, powders and whole beans can be mixed with other agents. These agents include, but are not limited to, various spices and fats as required for packaging.

RECONSTITUTION

The finished flaked product can be rehydrated instantly or within a few seconds, usually without stirring, in hot or cold water. Stirring after the addition of water assures consistency of wetting. Products with various textures and properties can be obtained by varying the particle size of the milled product, the post-dehydration processing steps, and by combining dried products of different sizes.

The dried flaked or powder product can be instantly reconstituted with water to a bean paste that can be used in Mexican style refried bean products. The dried product is reconstituted within a few seconds in hot or cold water with minimal stirring. The reconstitution of the dried product in cold water renders the dried product useful in a wide range of foods that are served cold, including bean dips and frozen foods.

Hot water is used to rehydrate the whole bean product. Reconstitution of whole beans occurs after 5 to 15 minutes.

The time required for rehydration is dependent on the temperature, time, and pressure used in the process, as well as type of legume processed.

EXAMPLE

Whole beans are washed and drained in a washing plant and transported to the process plant. The beans are conveyed (1) into receiving bins (2a, 2b). From the receiving bins, beans enter conveyors (4, 5) via a slide gate (3a, 3b) into a hopper (7) of a volumetric screw feeder (6). A portion of the beans is diverted into a parallel processing system after being conveyed on a belt conveyor to an inclined conveyor (28). The beans are then volumetrically metered into the grinder (8) where they are combined with heated water (9) at a rate of approximately 8,266 lbs/hr. The resulting slurry is pumped (10) at a rate of 12,266 lbs/hr into a surge tank (11) for 30 minutes of surge time. The slurry is then transferred (12) at a rate of 12,266 lbs/hr into swept surface heat exchangers (13) heated with steam (14), preferably two swept surface heat exchangers arranged in series (13a, 13b). It is preferred that the slurry is pre-heated to 100° F. The slurry is then heated from 100° F. to 320° F. and transferred at the same rate to a holding tube (15) where it cooks for 2–5 minutes. The slurry then passes through a swept surface heat exchanger (16), preferably arranged in series (16a, 16b), where the slurry is cooled from 320 to 190° F. Water at approximately 50° F. (17) is pumped (18) to the slurry in the first heat exchanger at a rate of 6,134 lbs/hr. This addition increases the flow rate though the coolers to 18,400 lbs/hr. After cooling to approximately 190° F., the cooked product is transferred (19) at a rate of 18,400 lbs/hr to a surge tank (20) with an agitator (21) for a holding time of 30 minutes. The time the cooled slurry is held in the surge tank is the shortest period of time consistent with the need to balance the flow of product throughout the entire process. The slurry is then pumped (22) into a recirculating loop to a drum dryer (23a–f) at a rate of 4,600 lbs/hr. A preferred arrangement is four drum dryers in series. The dried sheets are discharged onto conveyors (24a–f) to bucket elevators (25a–c) leading to flakers (26a–c) and then into a holding bin (27a, 27b) for subsequent transfer to packaging. The dried flakes and/or powders can be mixed with dried whole bean product.

In the parallel processing system, the beans are conveyed (28) to a hopper (29) which feeds (30a, 30b) the beans into a pressure cooker (31). Preferably, there are two pressure cookers aligned in parallel (31a, 31b). The pressure cooker is linked to a hot water supply (33) and a steam supply (34). The cooked product enters (32a, 32b) a conveyor (35) to a dewatering screen (36) where the cooked product is sprayed with cold water (37). The drained, cooled whole bean product is transported in a bucket elevator (38) to a belt dryer (39). The product which passes through the screen is transported (43) to a surge tank (20) for mixing with cooked, milled product. After drying the intact beans, the product is placed on a conveyor (40), then a bucket elevator (41) to a surge bin (42). The product is collected in a drum for subsequent transfer to packaging. The dried whole beans can be mixed with the dried flaked and/or powder product.

While this invention has been described in connection with specific embodiments, it should be understood that it is capable of further modification. The claims are intended to cover those variations which one of skill in the art would recognize as the equivalent of what has been described herein. Thus, various omissions, modifications, and changes to the principles described herein can be made by one skilled in the art without departing from the true scope and spirit of the invention, which is indicated by the following claims.

What is claimed is:

1. A method for producing dehydrated leguminous food products which with the addition of liquid instantly form a reconstituted food product having the characteristic flavor, appearance and color of non-dehydrated, cooked leguminous food products comprising the steps of;
    (a) milling the legumes to form a leguminous slurry or paste containing particles and liquid;
    (b) cooking the leguminous slurry or paste so as to yield a cooked leguminous food product;
    (c) drying the cooked leguminous food product so as to yield a dried leguminous food product, and
    (d) mixing the dried leguminous food product with a dried, cooked product of intact legumes.

2. The method of claim 1 wherein the legumes are beans.

3. The method of claim 1 wherein the legumes are dry or wet milled.

4. The method of claim 1 wherein the particles and liquid of step (a) are separated from each other after milling.

5. The method of claim 4 wherein the separation is accomplished with a mesh in a size range of 10–100.

6. The method of claim 3 wherein the leguminous slurry or paste contains 20–50% solids.

7. The method of claim 3 wherein other ingredients are added to the milled legumes.

8. The method of claim 1 wherein the slurry or paste is cooked by direct heating methods.

9. The method of claim 1 wherein the cooking occurs at atmospheric pressure.

10. The method of claim 1 wherein the leguminous slurry or paste is cooked at temperatures between 250 to 400° F. for 5 seconds to 15 minutes under pressures between 50–75 psi.

11. The method of claim 1 wherein the cooked leguminous food product is dried to a moisture content of 5–12%.

12. The method of claim 1 wherein the cooked leguminous food product is dried with a belt dryer, a spray dryer, a fluid bed dryer, a drum dryer or a tray dryer heated by steam, hot water, hot oil, heated air, electrical, infrared, microwave radiation or direct fire.

13. The method of claim 12 wherein the cooked leguminous food product is dried on a single drum dryer.

14. The method of claim 1 wherein the dried leguminous food product is further processed.

15. The method of claim 14 wherein the dried leguminous food product is milled or flaked.

16. The method of claim 1 wherein other ingredients are added to the dried leguminous food product.

17. The method of claim 1 which is automated by metering pumps and is self cleaning.

18. The method of claim 1 which is continuous.

19. The method of claim 1 wherein the cooking occurs under pressure.

20. The method of claim 1 wherein the slurry is cooked by indirect heating means.

21. The method of claim 12 wherein the cooked leguminous food product is dried on a double drum drier.

22. A method for producing dehydrated leguminous food products which with the addition of liquid instantly form a reconstituted food product having the characteristic flavor, appearance and color of non-dehydrated, cooked leguminous food products comprising the steps of;
    (a) milling legumes to form a leguminous slurry consisting of particles having a mesh size of 10 to 100 mesh and liquid or paste consisting of particles having a mesh size of 10 to 100 mesh and liquid;
    (b) cooking the leguminous slurry or paste so as to yield a first cooked leguminous food product;

(c) drying the first cooked leguminous food product so as to yield a first dried leguminous food product, and (d) mixing the first dried leguminous food product with a second dried, cooked product comprising legumes selected from the group consisting of cooked intact legumes and cooked less than intact legumes.

23. The process of claim 22 wherein said second dried, cooked product comprises cooked intact legumes.

24. The process of claim 22 wherein said second dried, cooked product comprises cooked less than intact legumes.

25. The process of claim 22 wherein after mixing the first dried leguminous food product with a second dried, cooked product comprising legumes selected from the group consisting of cooked intact legumes and cooked less than intact legumes to form a mixture, the mixture is rehydrated with liquid to form a reconstituted food product.

26. A method for producing dehydrated leguminous food products which with the addition of liquid instantly form a reconstituted food product having the characteristic flavor, appearance and color of non-dehydrated, cooked leguminous food products comprising the steps of;

(a) milling legumes to form a leguminous slurry consisting of particles having a mesh size of 10 to 100 mesh and liquid or paste consisting of particles having a mesh size of 10 to 100 mesh and liquid;

(b) cooking the leguminous slurry or paste so as to yield a first cooked leguminous food product;

(c) drying the first cooked leguminous food product so as to yield a first dried leguminous food product;

(d) cooking an amount of unmilled legumes and providing a slurry from said amount of unmilled legumes;

(e) removing slurry from the cooked amount of unmilled legumes and adding said slurry to the leguminous slurry or paste of step (b) before completing step (c); and (f) mixing the first dried leguminous food product with a second dried, cooked product comprising cooked legumes which comprise product of step (d).

27. The process of claim 26 wherein said unmilled legumes in step (d) comprise intact beans.

28. The process of claim 26 wherein said unmilled legumes in step (d) comprise less than intact beans.

29. A method for producing dehydrated leguminous food products which with the addition of liquid instantly form a reconstituted food product having the characteristic flavor, appearance and color of non-dehydrated, cooked leguminous food products comprising the steps of;

(a) milling legumes to form a leguminous slurry consisting essentially of particles having a mesh size of 10 to 100 mesh and liquid or paste consisting essentially of particles having a mesh size of 10 to 100 mesh and liquid;

(b) performing a step consisting of cooking the leguminous slurry or paste so as to yield a first cooked leguminous food product;

(c) drying the first cooked leguminous food product so as to yield a first dried leguminous food product, and (d) mixing the first dried leguminous food product with a second dried, cooked product comprising legumes selected from the group consisting of cooked intact legumes and cooked less than intact legumes.

30. The process of claim 29 wherein said leguminous slurry or paste cooked in step (b) consists essentially of milled legumes, water, fats, flavoring, salt, preservatives, spices and acid.

* * * * *